United States Patent [19]

Bauder

[11] Patent Number: 4,614,371
[45] Date of Patent: Sep. 30, 1986

[54] RING

[75] Inventor: Kurt Bauder, Weinheim, Fed. Rep. of Germany

[73] Assignee: Firma Carl Freudenberg, Weinheim, Fed. Rep. of Germany

[21] Appl. No.: 632,716

[22] Filed: Jul. 20, 1984

[30] Foreign Application Priority Data

Aug. 3, 1983 [DE] Fed. Rep. of Germany ... 8322349[U]
Mar. 19, 1984 [DE] Fed. Rep. of Germany ....... 3409982

[51] Int. Cl.⁴ ............................................. F16L 21/00
[52] U.S. Cl. .................................... 285/231; 285/345; 285/910; 285/915; 285/110; 277/235 R; 277/DIG. 2
[58] Field of Search ............... 285/231, 230, 345, 104, 285/110, 105, 915, 910, 233, 234; 277/235, DIG. 2, 207 A; 403/228, 225, 372

[56] References Cited

U.S. PATENT DOCUMENTS

| | | | |
|---|---|---|---|
| 2,201,372 | 5/1940 | Miller | 285/105 |
| 2,210,833 | 8/1940 | Clough | 277/235 R X |
| 2,797,944 | 7/1957 | Riesing | 277/235 R X |
| 3,445,120 | 5/1969 | Barr | 285/231 X |
| 3,489,421 | 1/1970 | Neilson | 277/235 R X |
| 3,866,925 | 2/1975 | Maimstrom | 277/235 R X |
| 4,401,325 | 8/1983 | Tsuchiya et al. | 285/231 |

FOREIGN PATENT DOCUMENTS 2536631  2/1977  Fed. Rep. of Germany ...... 285/230

Primary Examiner—Dave W. Arola
Attorney, Agent, or Firm—Felfe & Lynch

[57] ABSTRACT

A ring for the leak-proof and traction-resistant joining of the ends of two pipes which surround one another at a radial distance, made of a basic body of soft-elastic, resilient material having cylindrical contact surfaces engaging the pipes, and of a cone ring of unyielding material embedded therein, which is defined radially inwardly and outwardly by cone surfaces, in which cone ring the cone surfaces are inclined in the same direction and are at a distance from the surface of the oppositely-lying or confronting pipe which diminishes increasingly with increasing distance from its end.

14 Claims, 8 Drawing Figures

RING

BACKGROUND OF THE INVENTION

The invention relates to a ring for the sealing and traction-resistant coupling of the ends of two pipes fitted one inside the other with radial clearance.

Rings of the above-mentioned kind are used especially in the laying of large-size pipes, for example, in the laying of gas lines, water lines and sewer lines. These are usually assembled from individual pipes each having a cylindrically enlarged section, or bell, at one end. The end, or spigot, of the pipe next following can be inserted into this bell and sealed against the first pipe by the additional insertion of a ring of resilient material into the clearance between the bell and the spigot. It is true that a good seal is obtained only if the ring is considerably oversized with respect to the width of the gap it is sealing. This, however, makes assembly difficult, and can result in damage to the ring which, under certain circumstances, might fail to be observed.

It is an object of the invention to provide an improved ring of the above-described kind such that the difficulties described above will no longer occur. The ring is to assure, especially by simplified assembly, an absolutely tight and traction-resistant coupling between connected pipes.

SUMMARY OF THE INVENTION

This object is achieved in accordance with the invention, in a ring of the kind described above, by a basic body of soft, resilient material, having cylindrically shaped contact surfaces engaging the pipes, and by a cone ring of unyielding material embedded therein, which is defined radially inwardly and outwardly by cone surfaces, the cone surfaces sloping in the same direction and each being at a distance from the surface of the respective confronting pipe which diminishes with the distance from the end thereof.

The basic body of the proposed ring preferably is of rubber, which can have a Shore A hardness, for example, of 55. It can thus be inserted into the larger end or bell of the one pipe just as easily as it can be fitted over the smaller end or spigot of the other pipe. The deformations necessary for this purpose do not require a great exertion of effort. They are produced in the direction of the conically expanding gap between the pipe and the cone ring.

In cases in which the larger of the two pipes is formed by the radially expanded muff of a so-called "muff pipe," it has proven to be advantageous if the muff pipe is delivered to the work site with a ring already inserted in the muff. The section of such a pipe that is expanded radially is defined by a radially extending surface which prevents excessive slippage of the ring inserted into the muff when the adjoining pipe is pushed into it, and thus assures sealing and holding action of uniform quality.

The cone surface facing the outer of the two pipes ordinarily forms with the axis of rotation a smaller angle than the surface facing the inner of the two pipes. The contact pressure acting radially outwardly is therefore identical to that acting radially inwardly in the area of the cylindrical surface. The sealing and holding action achieved is therefore equal on both sides.

The proposed ring can be manufactured less expensively if the cone surfaces of the cone ring are parallel to one another. Such a cone ring can be produced, for example, by a deep drawing process from a circular disk of sheet steel.

The cone surfaces best form with the longitudinal axis an angle in the range of 10° to 40°. Smaller angles do produce a larger radial compressive force on the basic body between the axially adjoining surfaces of the pipe, but for the achievement of such pressure they necessitate a relatively great axial displacement of the two pipes, which is seldom practicable. If the angle, however, is greater than in the range of 10°–40°, then relatively small displacements will suffice for the establishment of contact pressure, but in this case the contact pressures obtained are relatively low and often do not provide the necessary tight engagement between the contact surfaces and the surface of the pipes, as, for example, when certain surface irregularities are present in this area. Concrete pipes, ceramic pipes, and pipes made of cast iron have, as a general rule, a corresponding corrugation of the surface.

In a preferred embodiment, provision is made for the inner contact surface to be prolonged towards the end of the inner pipe, and for the portion projecting axially beyond the cone ring to have, before the insertion of the pipe, an inside diameter that is smaller than the outside diameter of the inner pipe. The inner contact surface in such an embodiment can engage the surface of the pipe without bias, which greatly facilitates the pipe's insertion until the narrower portion projecting axially beyond the cone ring is reached. This portion, however, can be penetrated easily because it is not supported in the radial direction and thus can easily expand radially.

A corresponding expansion of the projecting portion proves to be easily accomplished especially when the projecting portion has but little thickness, being constituted, for example, by an annular membrane. After resilient expansion by the pipe, this membrane contacts the pipe very tightly and thus assures an excellent, leak-proof contact with the pipe.

If an axial traction stress is placed on the junction between the two pipes, the stress is transferred through the annular membrane to the portion of the basic body that is situated radially within the cone ring, and as a result the basic body is increasingly pressed into the narrowing gap between the inner of the two pipes and the cone ring. The basic body, however, consists of a non-compressible, resilient material. Axial displacement of the inner of the two pipes relative to the cone ring in the direction of the action of the force is therefore possible only to a very slight degree. The axial retention and sealing of the inner of the two pipes relative to the ring is accordingly excellent.

The ring is also incapable of displacement relative to the outer of the two pipes in the event of the same application of force. In this case, the forces acting in the opposite direction on the cone ring and the outer of the two pipes produce a radial compressive force on the portion of the ring that is situated radially outside of the cone ring in the conically narrowing gap between the outer pipe and the cone ring. Excellent holding as well as good sealing effect is thus also achieved between the outer pipe and the ring.

The same action is produced even when the junction between the two pipes is not exposed to tensile stress, if the front end of the ring is subjected to the pressure of the medium contained in the pipes, such as a liquid or a gas. This is because, in this case, a hydrostatic division of the front end surface into two areas of opposite action is produced. The application of the pressure only to the first of these two areas would result in leakage, and this area is the one that lies radially outside of the cone ring projected on the front end surface. The second area is the radial residual area lying within the above-mentioned area. The application of pressure to this area results in the pressing of the cylindrical surfaces of the ring against the walls of the pipes and thus in the achievement of a good sealing action. Since the last-named area is always made larger than the first-mentioned, the negative effect of the latter will always be outweighed, and a good seal will always be achieved even when traction stress is absent. The minimum distance between each cone surface and the corresponding pipe wall is accordingly to be selected so as to be as small as possible.

Damage to the annular membrane by the smaller of the pipes can easily be avoided if the thickness of the annular membrane has a smooth transition into the greater wall thickness of the basic body. In addition, the pipe to be inserted can be provided with a bevel or a slight round-over at its front end.

In accordance with one advantageous embodiment of the invention, provision is made for the outer contact surface of the basic body to be prolonged toward the end of the outer pipe, and for the portion projecting axially beyond the cone ring to have, before insertion into the pipe, an outside diameter that is greater than the inside diameter of the pipe. The remainder of the contact surface in this case does not have to be made larger than the inside diameter of the pipe, and this greatly facilitates the installation of the ring. The projecting portion can be of a bead-like configuration if desired.

In accordance with the invention, a ring for the leak-proof and traction-resistant coupling of the ends of two pipes having end faces and surrounding one another at a radial distance one from the other comprises a basic body of an elastic material having substantially cylindrically shaped inner and outer contact surfaces which engage the pipes and having therein an embedded cone ring of unyielding material which is defined radially inwardly and outwardly by inner and outer cone surfaces. The cone surfaces are inclined in the same direction and individually confront the pipes and each is at a distance from the surface of the confronting pipe which increasingly diminishes with increasing distance from the end face thereof.

For a better understanding of the present invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings.

In the Figs. similar members are designated by the same reference numerals and by the same reference numerals prime.

DESCRIPTION OF THE PREFERRED EMBODIMENTS

Figure 1:
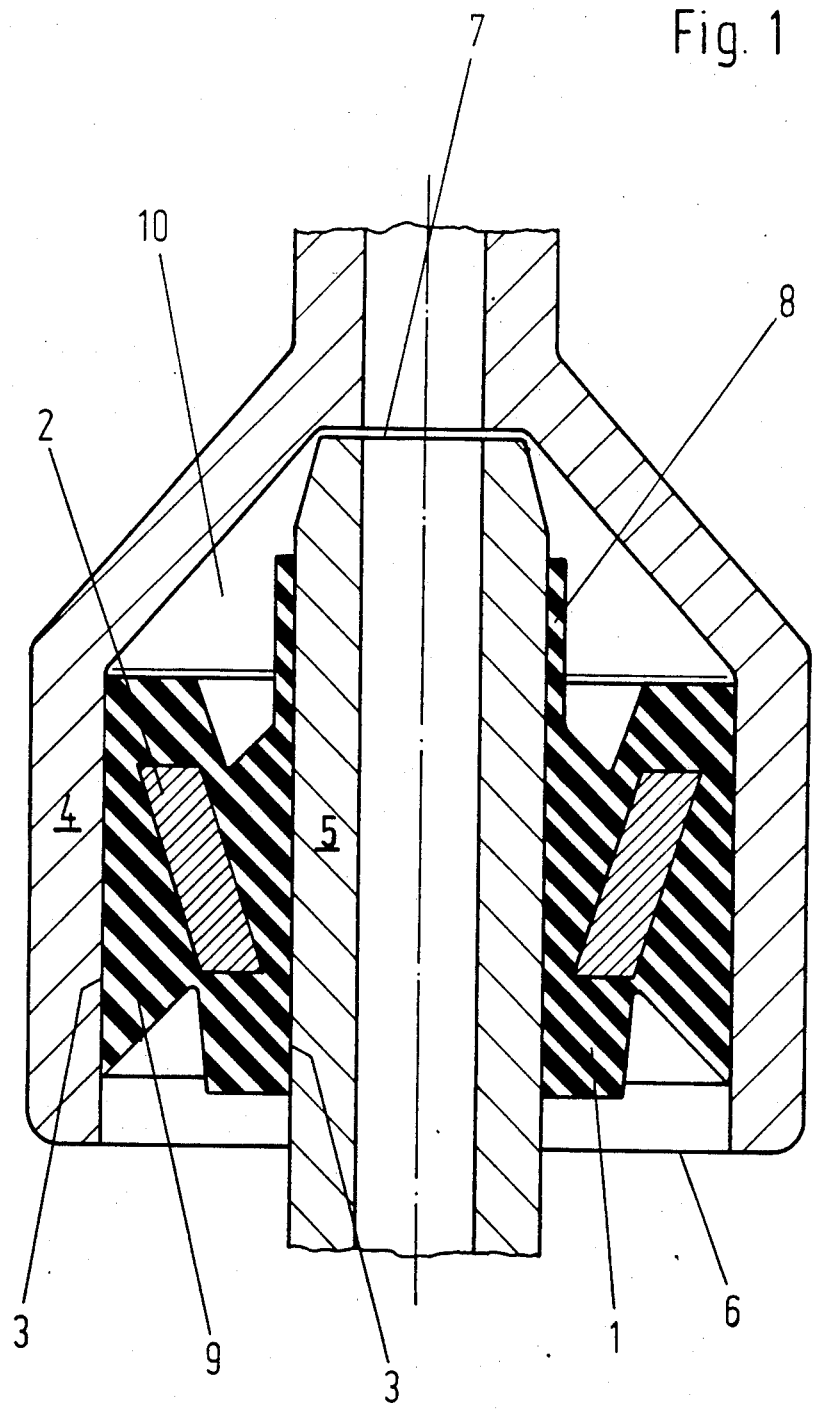
FIG. 1 is a sectional view of a ring constructed in accordance with the invention coupling the ends of two pipes.

The ring in the embodiment represented in FIG. 1 serves for joining the linearly abutting ends of two pipes in a leak-proof and traction-resistant manner. The upper of the two pipes is radially expanded adjacent its extremity and thus surrounds the end of the lower pipe with clearance. The ring constructed in accordance with the invention is inserted into this clearance. This ring comprises, in part, the basic body, which preferably is of soft-elastic, non-compressible rubber defined by the interior and exterior contact surfaces 3, which engage the confronting surfaces of the pipes 4 and 5 with a slight resilient bias.

The cone ring 2, which preferably is of metal, preferably is rigid and preferably is firmly vulcanized into the basic body 1. This ring is defined on the inside and on the outside by cone surfaces extending parallel to one another, the distance from the surface of the confronting pipe in each case diminishing increasingly with increasing distance from the end of the ring nearer the end of the confronting pipe. The minimum distance is thus identical in both cases.

The basic body is provided on the inside with the annular membrane portion 8 extending in the axial direction, and on the outside with the annular bead portion 9. Both the annular membrane portion 8 and the annular bead portion 9 engage with resilient bias the associated surface of the adjacent pipe. The annular membrane portion 8 and the remainder of the basic body 1 merge with one another with smoothly increasing wall thickness of the remainder of the basic body.

Functionally, the following is to be stated with regard to the above described pipe joint:

If a traction effort in axially opposite directions is applied to the joint, this will result in a radial compressive force on the basic body 1 between the outer pipe 4 and the cone ring 2 on the one hand, and between the cone ring 2 and the inside pipe 5 on the other. Both the cone ring and the two pipes are made of unyielding materials, and therefore deflection in the radial direction is impossible.

The basic body preferably is of soft-elastic, resilient, non-compressible material. It is therefore incapable of deforming beyond absolutely tight engagement, so that ultimately no further axial separation of the two pipes 4, 5, from one another is possible.

The application of traction therefore cannot result in the opening of the joint.

In addition, the large, radial compressive force on the basic body 1 between the confronting surfaces of the pipes 4 and 5 results in the achievement of excellent sealing. Liquids and gases, therefore, can no longer pass through the sealed gap between the two pipes.

A good seal in the gap, however, is assured even if the joint described in detail above is not stressed in the axial direction. The pressure in the annular chamber 10 corresponds in this case to the pressure of the sealed medium, and thus it is transferred to the end of the ring. The total area of the cone ring projected on this end face, however, is greater than the residual area remaining radially outside of it, and therefore the pressure cannot result in an axial displacement of the ring, but only in radial compressive force on the basic body between the confronting surfaces. The effect is intensified by the pressure affecting the basic body within the above-mentioned area.

The shape of the ring is adapted to the sealing gap, and to this extent it depends on the cross section of the pipes to be joined. In addition to round configurations, therefore, oval, polygonal, and other configurations are possible.

FIGS. 2 to 5 and FIG. 8 relate to modified embodiments of the proposed ring. The basic body is in all cases of substantially the same configuration. It contains, however, cone rings of different shapes.

Figure 2:
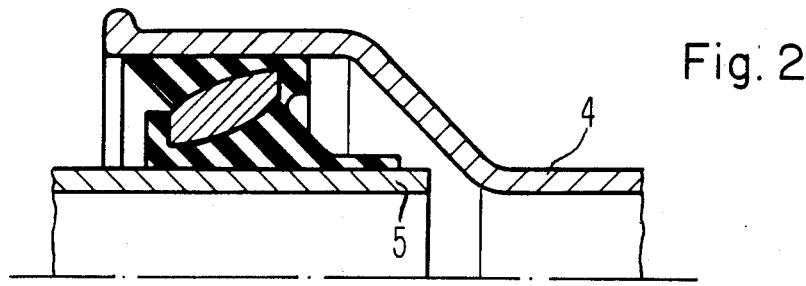
FIGS. 2 to 8, inclusive, are sectional views, similar to FIG. 1, to a reduced scale, representing other embodiments of the ring.

In the embodiment of FIG. 2, the angle between the outer and inner cone faces and the longitudinal extent of pipes 4 and 5 diminishes constantly in the direction away from the end faces of the respective confronting pipes. The cross-sectional shape of the cone ring is thus somewhat lenticular. Such a configuration is suitable especially for applications in which, in addition to severe traction stresses, slight angular shifts can occur between the tubes joined together.

Figure 3:
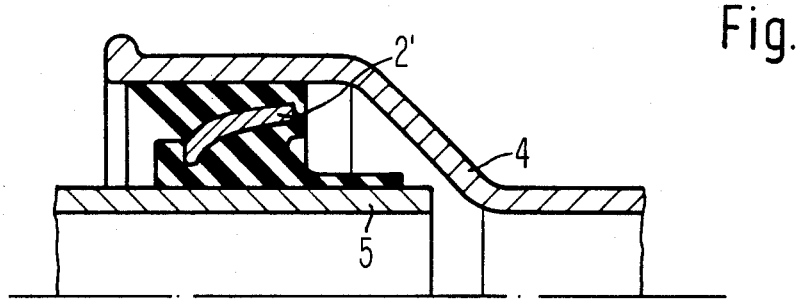

The embodiment shown in FIG. 3 is similar to the one described above. The cone surface of the cone ring 2 facing the inner pipe 5 of the pair of pipes being joined together has in this case, however, a concave curvature, and therefore the pressures introduced through the annular membrane can be even better utilized for the desired radial compressive force on the basic body between the cone ring and the inner pipe 5. This configuration is therefore especially good if the outside diameter of the pipe 5 may vary to any great extent.

Figure 4:
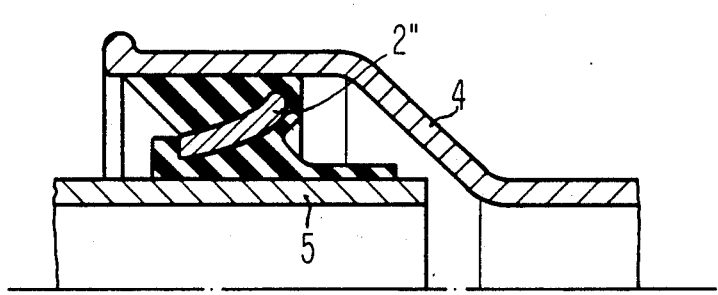

The embodiment represented in FIG. 4 is derived from the considerations set forth in conjunction with the embodiments of FIGS. 2 and 3. The cross-section of the cone ring 2 is in this case concave on the outside but convex on the inside. The inside diameter of the pipe 4 to be placed over it can thus differ to a greater extent from the standard value, while at the same time it becomes possible better to accomodate angular shifts between the pipes to be joined together. The cone ring 2 preferably is in this case, as in the embodiment represented in FIG. 3, of deep-drawn sheet steel. The cone surfaces thus run parallel to one another, and portions of different angle of inclination merge smoothly with one another.

Figure 5:
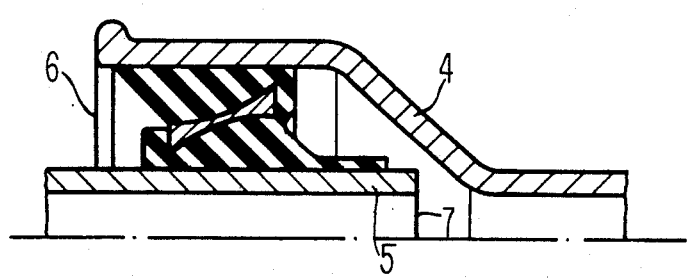

The cross-sectional profile of the cone ring of FIG. 5 presents a concavity facing outwardly and an equal concavity facing inwardly. The angle formed by the two cone faces with the axis of the pipes being joined together accordingly increases progressively with distance from their end faces 6 and 7. The inside diameter of the pipe 4 can therefore, like the outside diameter of pipe 5, be varied to a great degree, which reduces the cost of manufacture of the pipes.

Figure 8:
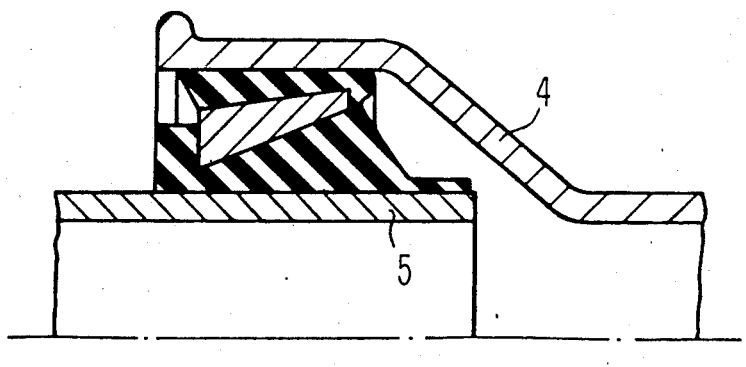

FIG. 8 relates to an embodiment in which the cross-sectional profile of the cone ring is rectilinear both inside and out. The inner cone surface forms with the axis of the pipes to be joined a larger angle than the outer cone surface, the two angles being selected such that the specific surface pressure achieved is equal on the inside and outside regardless of the difference in diameter.

For the operation of the ring of the invention, the cone ring preferably is rigid and preferably is made of an unyielding material. The preferred material is therefore steel, but other materials can be considered, such as plastics or hard PVC reinforced with mineral fibers, for example.

The cone ring is generally tightly adhered to the basic body, and this can be done by means of adhesives, for example. The assembly is then very rugged, and favors the use of the proposed ring at construction sites.

Embodiments in which the cone ring is embedded without bonding to the basic body are possible. They have the advantage of an especially good activation of radial forces in the area of the axial length of the cone ring, which is important with regard to the desired fixation and sealing of the pipes being joined together. In this case, to prevent the cone ring from being lost due to improper handling, it is nevertheless desirable that the cone ring be held axially at both ends by the basic body. This provides the additional advantage of better protection of the cone ring against corrosion when it is made of material subject to corrosion.

Regardless of the particular embodiment, the two cone surfaces can be very close together in the respect of the minimum distance from the associated pipe wall. This improves security against accidental escape in the event of the application of fluid pressure only. The value of the minimum distance can amount to about 0.3–10 mm, and depends on the radial length of the gap and on the particular elasticity of the material used in making the basic body.

Figure 6:
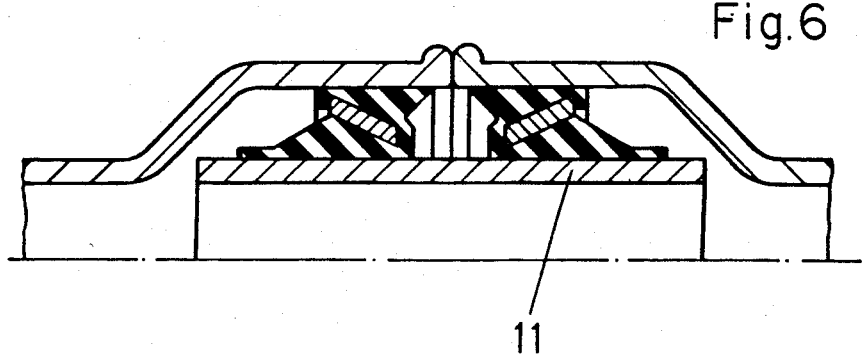
Figure 7:
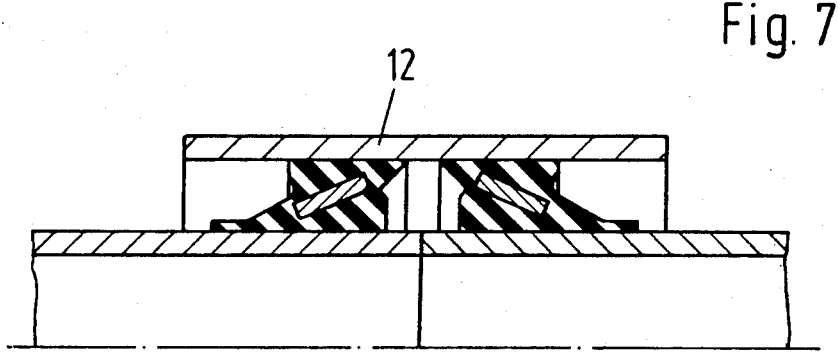

FIGS. 6 and 7 relate to special applications of the ring in cases wherein the pipes to be used do not overlap. In the embodiment shown in FIG. 6, the bell ends of two adjacent pipes abut one another on a common axis. In accordance with the invention they are coupled by a secondary tube 11 entering both bells and this tube is sealed and affixed to each of the two bells by rings of the proposed kind. The rings are in a mirror-image relationship to one another.

FIG. 7 relates to an application in which neither of the two pipes to be joined has a bell-mouth. The pipes can thus be of any desired cut length.

The coupling together of the two pipes is accomplished in this case by means of a muff 12 covering both of the abutting ends and sealed and held to each of the two pipes by a ring constructed in accordance with the invention.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A ring for the leak-proof and traction-resistant coupling of the ends of two pipes having end faces and surrounding one another at a radial distance one from the other, comprising:
   a basic body of an elastic material having substantially cylindrically shaped inner and outer contact surfaces which engage the pipes and having therein embedded an unyielding cone ring which is defined radially inwardly and outwardly by inner and outer cone surfaces, said cone surfaces being inclined in the same direction and individually confronting the pipes and each being at a distance from the surface of the respective confronting pipe which increasingly diminishes with increasing distance from the end face of the respective confronting pipe.

2. A ring in accordance with claim 1 in which said cone ring is rigid.

3. A ring in accordance with claim 1, in which the outer cone surface encloses with the longitudinal axis of the pipes a smaller angle than said inner cone surface.

4. A ring in accordance with claim 1, in which said cone surfaces of said cone ring are substantially parallel to one another.

5. A ring in accordance with claim 1, in which the angle between said outer and inner cone surfaces and the length of the pipes increases in the direction away from the end faces of the respective confronting pipes.

6. A ring in accordance with claim 1, in which the angle between the outer and inner cone surfaces and the length of the pipes diminishes in the direction away from the end faces of the respective confronting pipes.

7. A ring in accordance with claim 5, in which the areas of each cone surface which are associated with the length of the pipes at a deviating angle merge smoothly with one another.

8. A ring in accordance with claim 1, in which the cone surfaces and the longitudinal axis enclose an angle in the range of 10°–40°.

9. A ring in accordance with claim 1, in which said basic body has a portion projecting axially beyond said cone ring, said portion having before the insertion of the pipe an inside diameter that is smaller than the outside diameter of the pipe.

10. A ring in accordance with claim 9, in which said projecting portion comprises an annular membrane portion.

11. A ring in accordance with claim 10, in which said annular membrane portion and the remainder of said basic body merge with one another with smoothly increasing wall thickness of said remainder of said basic body.

12. A ring in accordance with claim 1, which includes a portion projecting axially beyond said cone ring and having before insertion into the pipe an outside diameter that is greater than the inside diameter of the pipe.

13. A ring in accordance with claim 12, in which said projecting portion comprises a bead portion.

14. A ring in accordance with claim 1, in which said basic body is of an elastic, non-compressible material.

* * * * *